(12) United States Patent
Sozer et al.

(10) Patent No.: US 12,493,461 B2
(45) Date of Patent: Dec. 9, 2025

(54) METHOD FOR PROVIDING RECOVERY OF MODULAR SOFTWARE ARCHITECTURE

(71) Applicant: OZYEGIN UNIVERSITESI, Istanbul (TR)

(72) Inventors: Hasan Sozer, Istanbul (TR); Ali Ekici, Istanbul (TR); Okan Orsan Ozener, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 0 days.

(21) Appl. No.: 18/273,282

(22) PCT Filed: Oct. 17, 2022

(86) PCT No.: PCT/TR2022/051148
§ 371 (c)(1),
(2) Date: Jul. 20, 2023

(87) PCT Pub. No.: WO2024/039318
PCT Pub. Date: Feb. 22, 2024

(65) Prior Publication Data
US 2024/0403033 A1    Dec. 5, 2024

(30) Foreign Application Priority Data
Aug. 19, 2022   (TR) .......................... TR2022//013118

(51) Int. Cl.
*G06F 8/71*    (2018.01)
*G06F 8/41*    (2018.01)

(52) U.S. Cl.
CPC ................ *G06F 8/71* (2013.01); *G06F 8/433* (2013.01)

(58) Field of Classification Search
CPC .................................... G06F 8/71; G06F 8/433
See application file for complete search history.

(56) References Cited

U.S. PATENT DOCUMENTS

| | | | | |
|---|---|---|---|---|
| 7,543,017 B1 * | 6/2009 | Roush | ..................... | G06F 15/16 |
| | | | | 709/217 |
| 8,862,563 B2 * | 10/2014 | Sivashanmugam | .......................... | |
| | | | | G06F 16/1748 |
| | | | | 707/705 |
| 9,223,566 B2 * | 12/2015 | Charters | ................... | G06F 8/70 |
| 9,588,761 B2 * | 3/2017 | Das | ........................... | G06F 8/75 |
| 9,626,167 B2 * | 4/2017 | Bonanno | ................. | G06F 8/433 |
| 10,419,374 B1 * | 9/2019 | Morris | .................... | H04L 51/04 |
| 11,775,394 B2 * | 10/2023 | Yadav | ................... | G06F 16/128 |
| | | | | 707/649 |

(Continued)

FOREIGN PATENT DOCUMENTS

WO    2013085887 A1    6/2013

OTHER PUBLICATIONS

Brian S. Mitchell, et al., On the Automatic Modularization of Software Systems Using the Bunch Tool, IEEE Transactions on Software Engineering, 2006, pp. 1-16, vol. 32, No. 3.

*Primary Examiner* — Douglas M Slachta
(74) *Attorney, Agent, or Firm* — Bayramoglu Law Offices LLC

(57) ABSTRACT

A method for providing recovery of modular software architecture using a processor unit that is configured to access a source code repository comprising the source codes of software consisting of a plurality of modules and configured to access a storage database comprising the update history of the source codes of the software.

9 Claims, 1 Drawing Sheet

(56) References Cited

U.S. PATENT DOCUMENTS

| | | | |
|---|---|---|---|
| 12,001,294 B2 * | 6/2024 | DeGraaf | G06F 9/547 |
| 2008/0148225 A1 | 6/2008 | Sarkar et al. | |
| 2010/0070948 A1 * | 3/2010 | Rama | G06F 8/72 |
| | | | 717/105 |
| 2010/0070949 A1 | 3/2010 | Rama et al. | |
| 2011/0239184 A1 * | 9/2011 | Feigen | G06F 8/24 |
| | | | 717/104 |
| 2013/0339818 A1 * | 12/2013 | Baker | G06F 3/0667 |
| | | | 714/763 |
| 2014/0173574 A1 * | 6/2014 | Schmidt | G06F 8/43 |
| | | | 717/143 |
| 2014/0280165 A1 * | 9/2014 | Jain | G06F 16/632 |
| | | | 707/738 |
| 2021/0182391 A1 * | 6/2021 | Plate | G06N 20/00 |
| 2022/0113989 A1 * | 4/2022 | Tamilselvam | G06F 8/72 |
| 2022/0129317 A1 * | 4/2022 | Thyng | G06F 8/36 |

* cited by examiner

METHOD FOR PROVIDING RECOVERY OF MODULAR SOFTWARE ARCHITECTURE

CROSS-REFERENCES TO THE RELATED APPLICATIONS

This application is the national stage entry of International Application No. PCT/TR2022/051148, filed on Oct. 17, 2022, which is based upon and claims priority to Turkish Patent Application No. 2022/013118, filed on Aug. 19, 2022, the entire contents of which are incorporated herein by reference.

TECHNICAL FIELD

The invention relates to a method for providing recovery of modular software architecture.

BACKGROUND

The architecture of a software system defines the high-level organization of software modules. For this reason, software architecture documentation is important to understand programs, ensure communication between developers, and maintain the system in a healthy way. This documentation often contains inaccuracies or omissions, especially for legacy systems. In addition, recovery of this documentation by reverse engineering requires a lot of effort, especially for large and complex systems. For this reason, Software Architecture Recovery (SAR) approaches have been developed to automatically recover software architecture documentation. These approaches enable to reveal the dependencies between software modules by analyzing the source code and to obtain the high-level organization of the system by clustering the modules according to these dependencies.

One of the criteria considered for the clustering of software modules is modularity. Modularity aims to group the modules with dependencies within the same cluster while keeping the dependency between the modules in different clusters low. This objective also coincides with the basic modularity principle observed in software design. For example, the modularity criterion proposed and used by Mitchell and Mancoridis (2006) in the article "On the automatic modularization of software systems using the Bunch tool" was defined with an objective function to maximize the connections with the cluster in which the modules are located and to minimize the connections to the external modules. This definition can be thought of as an ideal goal in terms of modularity at first glance. However, the best (optimal) solution obtained with this objective function places all modules in the same cluster, thus minimizing inter-cluster dependency while maximizing intra-cluster dependency.

The SAR approaches proposed so far perform clustering according to the dependency information obtained by analyzing the direct references in the source code as the inter-module dependency. Such dependencies are generally considered code dependencies. These dependencies are obtained by considering different types of references (e.g., function call, variable access, containing files, etc.) and may not always be on the same axis. That is, the clustering obtained with respect to one type of dependency may not overlap with the clustering obtained with respect to another type of dependency. There may be different types of dependencies beyond code dependencies among the modules of software systems in different application areas developed in different languages.

Patent application US2010070948 (A1), known in the present art, relates to a system and method for improving the modularity of a software system. This method includes the steps of obtaining the source code from a software system or application, decomposing the source code based on file information, function information, function dependency information, global variable information, data structure information, dependence between global variables and functions, data structures and functions to create a model of the source code. The method also includes the steps of performing modularity analysis using the source code model and the source code's architectural explanation document and detecting various modularity defects based on the modularity metric values. The effect of detected defects on software modularity is evaluated and appropriate solution prescriptions are created. In one application of the method, prescriptions that do not meet the selection criteria are discarded. In another application of the method, each recipe is evaluated for its impact on structural, architectural, conceptual, and dimensional modularity. In various embodiments of the method, only prescriptions that can improve the overall modularity of the system are selected. In yet another application of the method, if there is more than one prescription, user intervention is required to select a suitable prescription. The method also includes the steps of selecting optimal recipes to improve modularity and presenting them to the user through the user interface.

All the problems mentioned above have made it necessary to make an innovation in the relevant technical field as a result.

SUMMARY

The present invention relates to a method to eliminate the above-mentioned disadvantages and bring new advantages to the relevant technical field.

An objective of the invention is to provide a method for providing an improved recovery of modular software architecture.

Another objective of the invention is to provide a method for providing scalable and improved accuracy of software architecture documentation.

Another objective of the invention is to provide a method for saving labor in the costly software maintenance process.

Another objective of the invention is to provide a method to avoid changes that may be contradicted by the modular structure and errors that may occur due to these changes.

Another objective of the invention is to provide a method for detecting defects in the current organization of the software.

Another objective of the invention is to provide a method to improve the software design quality by reconstructing the software modules.

To achieve all the objectives mentioned above and that will emerge from the following detailed description, the present invention relates to a method for providing recovery of modular software architecture using a processor unit configured to access a source code repository comprising the source codes of software consisting of multiple modules and configured to access a storage database comprising the update history of the source codes of the software. Accordingly, the invention is characterized in that it comprises the process steps of;

accessing the said source code repository, detecting predetermined references in the codes of different modules in the source code repository,
detecting different modules containing the same references,
determining a structural dependence between modules based on the number of same references contained in the different modules,
accessing the said storage database,
detecting integrated updates whose update times are in predetermined proximity,
detecting the integrated modules included together in the said integrated updates,
determining an evolutionary dependency between modules based on the number of integrated updates in which the said integrated modules are present together,
based on the said structural dependence between the modules, clustering the modules in a predetermined number of clusters, with each module is in one cluster, and forming a structural dependency cluster,
based on the said evolutionary dependence between the modules, clustering the modules in a predetermined number of clusters, with each module is in one cluster and forming an evolutionary dependency cluster,
combining the said structural dependency cluster and the said evolutionary dependency cluster based on predetermined weight coefficients and obtaining the final cluster.

Thus, it is ensured that the software architecture documentation of the system is recovered by clustering these modules according to the dependencies between the software modules obtained by analyzing the source codes and storages. In addition, the accuracy of modular software architecture recovery is increased by using multiple and different types of inter-module dependency data. In this way, it is ensured that the workforce is saved during the maintenance of the software systems. In addition, it is ensured that the software codes can be reconfigured and infrastructure is prepared for the transition to (micro) service architectures. In addition, with the modular architectural structure, it is ensured that the changes that may be contradicted and the errors that may arise for this reason are avoided. It is also ensured that defects in the current organization of the software are detected and thus the quality of the software design is improved.

A possible embodiment of the invention is characterized in that the said references are method/function calls or variable accesses.

Another possible embodiment of the invention is characterized in that it comprises the process steps;
detecting the textual similarities of the codes of the different modules contained in the source code repository,
determining a semantic dependency between modules based on the textual similarity ratio,
based on the said semantic dependence between the modules, clustering the modules in a predetermined number of clusters, with each module is in one cluster and forming a semantic dependency cluster,
combining the said structural dependency cluster, the said evolutionary dependency cluster and the said semantic dependency cluster based on predetermined weight coefficients and obtaining the final cluster.

In this way, it is allowed to use multiple and different types of dependency data between modules. Thus, the accuracy of modular software architecture recovery is increased.

Another possible embodiment of the invention is characterized in that it comprises the process steps;
detecting the accesses of the different modules in the source code repository at runtime,
determining a dynamic dependency between modules based on the said accesses,
based on the said dynamic dependence between the modules, clustering the modules in a predetermined number of clusters, with each module is in one cluster and forming a dynamic dependency cluster,
combining the said structural dependency cluster, the said evolutionary dependency cluster and the said dynamic dependency cluster based on predetermined weight coefficients and obtaining the final cluster.

In this way, it is allowed to use multiple and different types of dependency data between modules. Thus, the accuracy of modular software architecture recovery is increased.

Another possible embodiment of the invention is characterized in that it comprises the process steps;
detecting the access of the different modules in the source code repository to the common components,
determining an external dependency between modules based on the said common accesses,
based on the said external dependence between the modules, clustering the modules in a predetermined number of clusters, with each module is in one cluster and forming an external dependency cluster,
combining the said structural dependency cluster, the said evolutionary dependency cluster and the said external dependency cluster based on predetermined weight coefficients and obtaining the final cluster.

In this way, it is allowed to use multiple and different types of dependency data between modules. Thus, the accuracy of modular software architecture recovery is increased.

Another possible embodiment of the invention is characterized in that the said components are a variable, a function, a database table or a resource.

Another possible embodiment of the invention is characterized in that it comprises the process steps;
detecting the textual similarities of the codes of the different modules contained in the source code repository,
determining a semantic dependency between modules based on the textual similarity ratio,
based on the said semantic dependence between the modules, clustering the modules in a predetermined number of clusters so that each module is in one cluster and forming a semantic dependency cluster,
detecting the accesses between the different modules in the source code repository at runtime,
determining a dynamic dependency between modules based on the said accesses,
based on the said dynamic dependence between the modules, clustering the modules in a predetermined number of clusters so that each module is in one cluster and forming a dynamic dependency cluster,
detecting the access of different modules in the source code repository to common components,
determining an external dependency between modules based on the said common accesses,
based on the said external dependence between the modules, clustering the modules in a predetermined number of clusters, with each module is in one cluster and forming an external dependency cluster,
combining the said structural dependency cluster, the said evolutionary dependency cluster, the said semantic dependency cluster, the said dynamic dependency cluster, and the said external dependency cluster based on predetermined weight coefficients and obtaining the final cluster.

In this way, it is allowed to use multiple and different types of dependency data between modules. Thus, the accuracy of modular software architecture recovery is increased.

Another possible embodiment of the invention is characterized in that the said source code repository and the said storage database are provided in a memory unit.

Another possible embodiment of the invention is characterized in that the said processor unit accesses the said source code repository and the said storage database via a data bus.

REFERENCE NUMBERS GIVEN IN THE FIGURES

Figure 1:
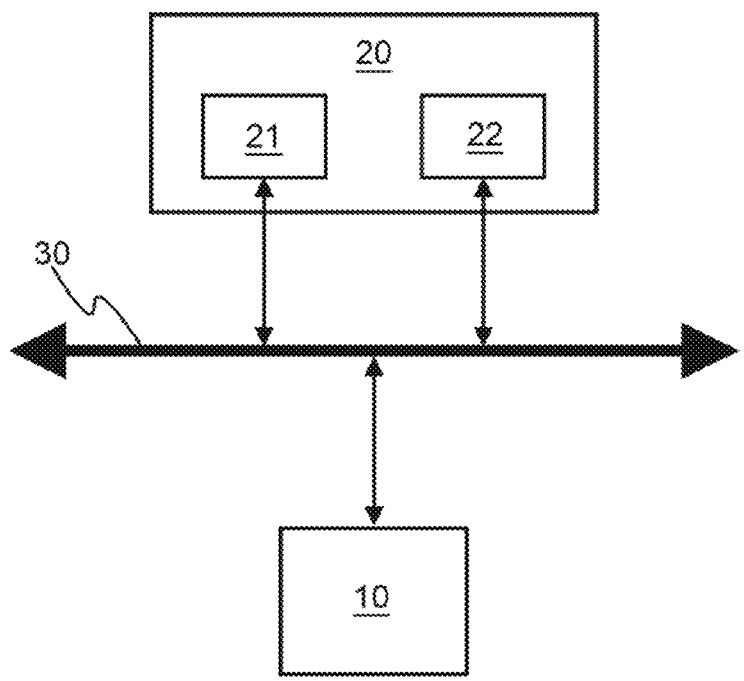
FIG. 1 shows a representative view of the components performing the method of the invention.

10 Processor unit
20 Memory unit
21 Source code repository
22 Storage database
30 Data Bus
1, 2, 3, 4 Software modules

DETAILED DESCRIPTION OF THE EMBODIMENTS

In this detailed description, the method of the invention is explained with examples that do not have any limiting effect only for a better understanding of the subject.

The invention relates to a method carried out using a processor unit (10) configured to access a source code repository (21) comprising the source codes of software consisting of multiple modules and configured to access a storage database (22) comprising the source codes of the update history of the said software. The said method provides the recovery of modular software architecture. The said method is characterized in that multiple and different types of inter-module dependency data are used.

The method of invention is a method performed through the said processor unit (10). The processor unit (10) may be a microprocessor, such as a CPU, or GPU, known in the art, which enables the execution of commands in internal and/or external memory. The said source code repository (21) and the said storage database (22) are also data storage or memory elements known in the art. In a possible embodiment, the source code repository (21) and the storage database (22) are provided in a memory unit (20). The said memory unit (20) is also a data storage element such as RAM, ROM, SSD, and HDD known in the art and having a memory capacity. Referring to FIG. 1, the processor unit (10) accesses the source code repository (21) and the storage database (22) via a data bus (30). The said data bus (30) provides data communication between the source code repository (21) and the storage database (22) of the processor unit (10).

The processor unit (10) uses the dependencies between the modules as input data and groups the modules according to this data. Interdependencies between software modules are modeled with design structure matrices or weighted/unweighted, oriented/unoriented graphs. In addition to the modeling method, the method essentially differs according to the types of dependence that these models describe.

The processor unit (10) accesses the said source code repository (21) to ensure recovery of the modular software architecture. The processor unit (10) enables the predetermined references in the codes of the different modules in the source code repository (21) to be determined. The processor unit (10) enables the detection of different modules containing the same references. A structural dependency between modules is determined based on the number of same references contained in different modules. The said structural dependence is a dependence that is also characterized as code dependencies and is determined by references in the code between different modules. These references can be found in the form of method/function calls or variable accesses and can be obtained by static code analysis.

The processor unit (10) also accesses the said storage database (22). The processor unit (10) detects integrated updates whose update times are in predetermined proximity. The integrated modules included in the said integrated updates are also determined. An evolutionary dependency between modules is determined based on the number of integrated updates in which the said integrated modules are included together. The said evolutionary dependence is a dependency defined for modules whose change times are close to or co-existent in the source code stores. The fact that a change to be made to the software affects two different modules or that a change made in one of these modules is reflected in the other module is considered an indication that there is a dependency between these modules.

The processor unit (10) detects the textual similarities of the codes of the different modules in the source code repository (21). The processor unit (10) enables the determination of a semantic dependence between modules based on the textual similarity ratio. The said semantic dependence is a dependency between modules determined by analyzing the text information (such as variable/function names and comments) in the software code. With the semantic analysis of this information, modules that may be related to each other are revealed.

The processor unit (10) detects the accesses between the different modules in the source code repository (21) at runtime. The processor unit (10) enables the determination of a dynamic dependence between modules based on the said accesses. The said dynamic dependence can be considered as a kind of code dependence; however, unlike structural dependence, it is determined by analyzing the accesses performed between the modules at runtime.

The processor unit (10) detects the access of the different modules in the source code repository (21) to the common components. The processor unit (10) provides for determining an external dependency between modules based on the said common accesses. The said external dependence is performed by detecting access to a common variable, a database table, and/or a common resource (e.g., file, socket, etc.), even if the software modules do not directly access each other. A dependency arises between these modules. Such external dependencies affect both the software performance and reliability at the time of the harness and the effort spent in the software development and maintenance process.

Figure 2A:
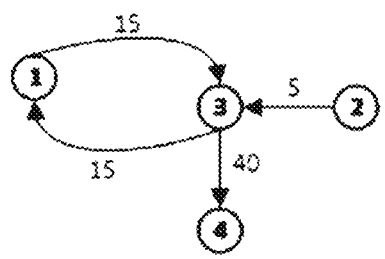
FIG. 2A shows an example graph model view of the number of accesses between the software modules at runtime.

In the graph model shown in FIG. 2A, a weighting is made to reflect the frequency of access of each module to other modules during the execution of the software. If modules in different clusters are deployed on different platforms, servers, or process groups, the frequency of access between clusters is important for software performance.

Figure 2B:
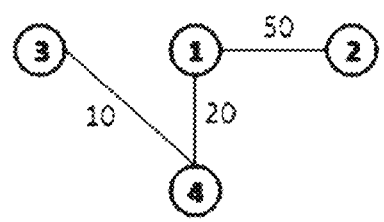
FIG. 2B shows an example graph model view of the number of accesses of software modules to common components.

In the sample graph model shown in FIG. 2B, the amounts of dependence on a common resource for the same modules are represented. This common resource may be another software unit/library, a file, a network socket, or a data source. Especially in distributed deployments, the amount of data dependency between clusters may also be a constraint due to the bandwidth that will limit the amount of data sharing between modules. As another example, a software system developed according to the MVC (Model-View-Control) architecture is divided into 3 main components. However, the software modules clustered within the scope of these components are dependent on common third components rather than being dependent on each other. For example, the software modules related to the Model access more common data, and the software modules related to the View access more graphical interface library and are therefore dependent on common units.

Figure 2C:
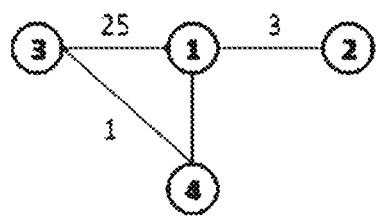
FIG. 2C shows an example graph model view of the number of integrated updates of software modules.

FIG. 2C shows an example graph model that reflects the amount of evolutionary dependence that is important for the sustainability of the software. If the software architecture is designed considering the changes to be made in the system, its basic organization will be predominantly shaped according to this type of dependency.

As with the example graph models listed in FIG. 2, clustering performed according to any dependency model may not be appropriate for another model. According to a model, while the modularity criterion is increased and the inter-cluster dependency amounts are reduced, it may be that these goals are avoided or constraints are not met in terms of a different type of dependency. For example, according to the graph model shown in FIG. 2A, modules 1 and 2, which are not dependent, can be grouped in different clusters. However, as can be seen in FIG. 2B, the data dependency between these two modules is very high. If this level exceeds the bandwidth that can be provided between any cluster, it should not be possible to deploy these two modules in different clusters.

The processor unit (10) provides a predetermined number of clusters of modules, each module being in a cluster, and the creation of a cluster of structural dependencies, based on the said structural dependence between the modules. The processor unit (10) also enables the modules to be clustered in a predetermined number of clusters and an evolutionary dependency cluster to be created so that each module is in one cluster, based on the said evolutionary dependency between the modules. In a possible embodiment, the processor unit (10) provides a predetermined number of clusters of modules and the creation of a semantic dependency cluster such that each module is in one cluster, based on the said semantic dependence between the modules. In a possible embodiment, the processor unit (10) provides a predetermined number of clusters of modules and the creation of a dynamic cluster of dependencies, each module being in a cluster, based on the said dynamic dependency between the modules. In a possible embodiment, the processor unit (10) provides a predetermined number of clusters of modules and the creation of an external dependency cluster, each module being in a cluster, based on the said external dependency between the modules. In a possible embodiment, the processor unit (10) comprises a clustering algorithm to enable the modules to be clustered in a predetermined number of clusters. The said clustering algorithm can be a mathematical algorithm in which exact or heuristic methods or both exact and heuristic methods are used.

Clustering for modularity aims to group the node cluster in this graph into V, k different clusters, C1, C2, ... Ck by taking the graph model as an input. In this grouping, it is aimed to obtain the highest level of modularity. The level of modularity is determined by a criterion (M) as defined below.

$$M = \frac{1}{2m} \sum_{l=1}^{k} \sum_{i,j | w_i, w_j \in C_l} \left( w_{ij} - \frac{d_i d_j}{2m} \right)$$

In this definition, wij refers to the weight of the dependence between vi and vj nodes. di and m values are defined as follows:

$$d_i = \sum_{j \neq i} w_{ij}, \quad m = \frac{1}{2} \sum_i d_i m = \frac{1}{2} \sum_i d_i$$

The M criterion defined above maximizes the number of edges between nodes in the same cluster while minimizing the number of edges between nodes in different clusters and balancing these two objectives. In the equation, it is seen that the wij values are only collected for the node pairs in the same cluster. Therefore, reducing the number of clusters and hence increasing the size of each cluster is rewarded by the addition of more pairs of nodes. On the other hand, grouping nodes without the edges in the same cluster reduces the criterion value. The wij value will be 0 for independent node pairs in the same cluster. However, there is a penalty share of up to didj/2m for each pair in this way. The amount of the penalty share is proportional to the amount of dependence between these nodes and all other nodes in the graph.

The processor unit (10) ensures that the said structural dependency cluster and the said evolutionary dependency cluster are combined based on the predetermined weight coefficients and the final cluster is obtained. In a possible embodiment, the processor unit (10) provides for combining the structural dependency cluster, the evolutionary dependency cluster, and the semantic dependency cluster based on predetermined weight coefficients and obtaining the final cluster. In another possible embodiment, the processor unit (10) provides for combining the structural dependency cluster, the evolutionary dependency cluster, and the dynamic dependency cluster based on predetermined weight coefficients and obtaining the final cluster. In another possible embodiment, the processor unit (10) provides for combining the structural dependency cluster, the evolutionary dependency cluster, and the external dependency cluster based on predetermined weight coefficients and obtaining the final cluster. In another possible embodiment, the processor unit (10) enables the structural dependency cluster, the evolutionary dependency cluster, the semantic dependency cluster, the dynamic dependency cluster, and the external dependency cluster to be combined based on predetermined weight coefficients and to obtain the final cluster.

In a possible embodiment of the invention, the processor unit (10) comprises a cluster aggregation algorithm to enable the final cluster to be obtained. The said cluster aggregation algorithm enables each dependency cluster to be aggregated based on predetermined weight coefficients. In another possible embodiment of the invention, the processor unit (10) performs clustering separately according to each addiction type by means of the cluster aggregation algorithm and combines the obtained clustering results later to obtain the final cluster. In another possible embodiment, the processor unit (10) uses different types of dependencies simultaneously as inputs during clustering. In this embodiment, priority is determined by giving different weight values to each species among different dependency types through the cluster merging algorithm. A cluster aggregation algorithm can be a mathematical algorithm in which exact or heuristic methods or both exact and heuristic methods are used.

In table 1 below, 4 different clustering results (K1, K2, K3, K4) of 8 software modules (x1, x2, . . . , x8) are listed as examples.

TABLE 1

Application of aggregation with an exemplary cluster

| Software Modules | $K_1$ | $K_2$ | $K_3$ | $K_4$ | K |
|---|---|---|---|---|---|
| $x_1$ | 1 | 1 | 1 | 1 | 1 |
| $x_2$ | 1 | 2 | 2 | 2 | 2 |
| $x_3$ | 2 | 1 | 1 | 1 | 1 |
| $x_4$ | 2 | 2 | 2 | 2 | 2 |
| $x_5$ | 3 | 3 | 3 | 3 | 3 |
| $x_6$ | 3 | 4 | 3 | 3 | 3 |
| $x_7$ | 5 | 5 | 5 | 5 | 5 |
| $x_8$ | 5 | 5 | 5 | 6 | 5 |

The rows of this table list the cluster to which the corresponding software module is assigned. In the last column, it shows the proposed clustering with the least discrepancies between all clustering results. According to this cluster, x1 and x3, x2 and x4, x5 and x6, x7 and x8 are in the same clusters. In this example, there is only one discrepancy (x6) between the resulting clustering (K) and K2. When compared with K4, there is a discrepancy (x8). However, according to K1 results, there are 2 inconsistent clusters (x2, x3). A total of 4 inconsistencies are noteworthy. The objective of the clustering aggregation algorithm is to achieve a common clustering result in such a way that the total number of these discrepancies is minimized.

The scope of protection of the invention is specified in the attached claims and cannot be limited to those explained for sampling purposes in this detailed description. It is evident that a person skilled in the art may exhibit similar embodiments in light of the above-mentioned facts without drifting apart from the main theme of the invention.

The invention claimed is:

1. A method for providing recovery of modular software architecture by means of a processor unit configured to access a source code repository comprising source codes of software consisting of a plurality of modules and configured to access a storage database comprising an update history of source codes of the software, the method comprises the process steps of:
    accessing the source code repository,
    detecting predetermined references in the codes of different modules in the source code repository,
    detecting different modules containing same references,
    determining a structural dependence between modules based on a number of same references contained in the different modules containing same references,
    accessing the storage database,
    detecting integrated updates whose update times are in predetermined proximity,
    detecting integrated modules included together in the integrated updates,
    determining an evolutionary dependency between modules based on a number of integrated updates in which the integrated modules are present together,
    based on the structural dependence between the modules, clustering the modules in a predetermined number of clusters, with each module is in one cluster and forming a structural dependency cluster,
    based on the evolutionary dependence between the modules, clustering the modules in a predetermined number of clusters, with each module is in one cluster and forming an evolutionary dependency cluster,
    combining the structural dependency cluster and the evolutionary dependency cluster based on predetermined weight coefficients and obtaining a final cluster, and
    performing, by the processor unit, modular software architecture recovery based on the final cluster.

2. The method according to claim 1, wherein the references are method/function calls or variable accesses.

3. The method according to claim 1, further comprises the process steps of:
    detecting textual similarities of the codes of the different modules in the source code repository,
    determining a semantic dependency between modules based on a textual similarity ratio,
    based on the semantic dependence between the modules, clustering the modules in a predetermined number of clusters, with each module is in one cluster and forming a semantic dependency cluster, and
    combining the structural dependency cluster, the evolutionary dependency cluster and the semantic dependency cluster based on predetermined weight coefficients and obtaining the final cluster.

4. The method according to claim 1, further comprises the process steps of:
    detecting accesses between the different modules in the source code repository during at runtime,
    determining a dynamic dependency between modules based on the accesses,
    based on the dynamic dependence between modules, clustering the modules in a predetermined number of clusters, with each module is in one cluster and forming a dynamic dependency cluster, and
    combining the structural dependency cluster, the evolutionary dependency cluster and the dynamic dependency cluster based on predetermined weight coefficients and obtaining the final cluster.

5. The method according to claim 1, further comprises the process steps of:
    detecting access of the different modules in the source code repository to common components,
    determining an external dependency between modules based on common accesses,
    based on the external dependence between the modules, clustering the modules in a predetermined number of clusters, with each module is in one cluster and forming an external dependency cluster, and
    combining the structural dependency cluster, the evolutionary dependency cluster and the external dependency cluster based on predetermined weight coefficients and obtaining the final cluster.

6. The method according to claim 5, wherein the common components are a variable, a function, a database table or a resource.

7. The method according to claim 1, further comprises the process steps of:
- detecting textual similarities of the codes of the different modules in the source code repository,
- determining a semantic dependency between modules based on a textual similarity ratio,
- based on the semantic dependence between the modules, clustering the modules in a predetermined number of clusters so that each module is in one cluster and forming a semantic dependency cluster,
- detecting accesses between the different modules in the source code repository at runtime, determining a dynamic dependency between modules based on the accesses,
- based on the dynamic dependence between the modules, clustering the modules in a predetermined number of clusters so that each module is in one cluster and forming a dynamic dependency cluster,
- detecting access of the different modules in the source code repository to common components,
- determining an external dependency between modules based on the common accesses,
- based on the external dependence between the modules, clustering the modules in a predetermined number of clusters, with each module is in one cluster and forming an external dependency cluster, and
- combining the structural dependency cluster, the evolutionary dependency cluster, the semantic dependency cluster, the dynamic dependency cluster and the external dependency cluster based on predetermined weight coefficients and obtaining the final cluster.

8. The method according to claim 1, wherein the source code repository and the storage database are provided in a memory unit.

9. The method according to claim 1, wherein the processor unit accesses the source code repository and the storage database via a data bus.

* * * * *